(12) United States Patent
Shihab

(10) Patent No.: US 8,279,822 B2
(45) Date of Patent: Oct. 2, 2012

(54) METHOD AND APPARATUS FOR SCHEDULING AN ACKNOWLEDGEMENT IN A WIRELESS COMMUNICATION SYSTEM

(75) Inventor: Jamil M. Shihab, Algonquin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 257 days.

(21) Appl. No.: 12/689,274

(22) Filed: Jan. 19, 2010

(65) Prior Publication Data

US 2011/0158186 A1 Jun. 30, 2011

Related U.S. Application Data

(60) Provisional application No. 61/291,063, filed on Dec. 30, 2009.

(51) Int. Cl.
*H04W 72/14* (2009.01)
*H04J 1/16* (2006.01)
*H04L 1/14* (2006.01)

(52) U.S. Cl. ......... 370/329; 370/235; 370/252; 714/750

(58) Field of Classification Search ............ 370/328, 370/338, 252, 236, 235, 22–230, 329, 468, 370/474; 714/748–750
See application file for complete search history.

(56) References Cited

U.S. PATENT DOCUMENTS

| 6,208,620 | B1 | 3/2001 | Sen et al. | |
|---|---|---|---|---|
| 6,628,629 | B1 | 9/2003 | Jorgensen | |
| 6,876,639 | B1 | 4/2005 | Cao | |
| 7,633,869 | B1 * | 12/2009 | Morris et al. | 370/232 |
| 7,903,690 | B2 * | 3/2011 | Wakid | 370/474 |
| 2004/0052234 | A1 * | 3/2004 | Ameigeiras et al. | 370/338 |
| 2004/0120306 | A1 * | 6/2004 | Wigard et al. | 370/349 |
| 2005/0249118 | A1 * | 11/2005 | Terry et al. | 370/235 |
| 2007/0081513 | A1 * | 4/2007 | Torsner | 370/349 |
| 2007/0230479 | A1 | 10/2007 | Liu | |
| 2008/0025334 | A1 * | 1/2008 | Smith et al. | 370/412 |
| 2008/0080464 | A1 | 4/2008 | Speight | |
| 2008/0279171 | A1 * | 11/2008 | Kim et al. | 370/346 |

FOREIGN PATENT DOCUMENTS

EP 1959693 A1 8/2008

OTHER PUBLICATIONS

Kliazovich D. et al.: "A cross-layer scheme 1-15 for TCP performance improvement in wireless LANs", Global Telecommunications Conference, 2004, GLOBECOM '04, IEEE Dallas, TX, USA Nov. 29-Dec. 3, 2004, Piscataway, NJ, USA, IEEE, Piscataway, NJ, USA vol. 2, pp. 840-844.

European Extended Search Report, Munich, Germany, Apr. 20, 2011, 9 pages.

* cited by examiner

*Primary Examiner* — Kwang B Yao
*Assistant Examiner* — Candal Elpenord

(57) ABSTRACT

A communication system is provided that facilitates an expedited exchange of a Transmission Control Protocol (TCP) acknowledgment by scheduling the TCP acknowledgment at a higher priority than Best Effort and/or by arranging for a scheduling of the TCP acknowledgment based on a predicted transmission of a request to schedule the TCP acknowledgment.

17 Claims, 4 Drawing Sheets

METHOD AND APPARATUS FOR SCHEDULING AN ACKNOWLEDGEMENT IN A WIRELESS COMMUNICATION SYSTEM

CROSS-REFERENCE TO RELATED APPLICATION

This application claims priority from provisional application Ser. No. 61/291,063, entitled "METHOD AND APPARATUS FOR SCHEDULING AN ACKNOWLEDGMENT IN A WIRELESS COMMUNICATION SYSTEM," filed Dec. 30, 2009, which is commonly owned and incorporated herein by reference in its entirety.

FIELD OF THE INVENTION

The present invention relates generally to wireless communication systems, and, in particular, to scheduling of acknowledgments in a wireless communication system.

BACKGROUND OF THE INVENTION

When two wireless communication devices, such as a base station and a user equipment, engage in a reliable wireless communication session, the communication devices implement an exchange of acknowledgements (ACKs) and/or negative acknowledgements (NACKs) at various protocol layers, such as between Hybrid Automatic Repeat reQuest (HARM) functionalities at a Physical Layer, Radio Link Control (RLC) functionalities at a Link Layer, and Transmission Control Protocol (TCP) functionalities at a Network Layer. The acknowledgements and negative acknowledgements are intended to inform, by a communication device receiving a wireless data transmission, the corresponding peer of a transmitting communication device of correctly received data and to request, from the corresponding peer, retransmissions of incorrectly received data, thereby assuring that data is correctly received at a given layer before the received data is passed to a higher layer at the receiving communication device.

The standards provide that TCP acknowledgments of TCP data, exchanged between peer TCP sublayers, are accorded Best Effort (BE) scheduling priority. Best Effort priority is a lower scheduling priority than Guaranteed Bit Rate (GBR) applications, that is, Best Effort data is queued behind data of GBR applications, and further competes with other Best Effort priority data for scheduling over the available bandwidth. For example, on an uplink, TCP acknowledgments typically are scheduled after Best Effort user data. This can result in a delay of conveyance, by a receiving communication device, of a TCP acknowledgment. In turn, delay of TCP acknowledgments can result in spurious timeouts at a TCP sender and reduced system throughput. That is, a TCP sender, of a transmitting communication device, defers transmitting remaining, not yet transmitted, data until correct receipt of the already transmitted data is acknowledged by the corresponding TCP functionality of the receiving communication device. Thus, a delay in a conveyance of TCP acknowledgments can result in the rapid filling up of a buffer storing data received from higher layers by a TCP sender, holding up further transmissions of data or possibly resulting in a discarding of data, and TCP data may be retransmitted even though the data has been correctly received at the TCP receiver of a receiving communication device, thus consuming limited system capacity.

Therefore a need exists for a method and an apparatus for facilitating an expedited exchange of TCP acknowledgments, thereby minimizing spurious timeouts at a TCP sender, reduced system throughput, buffer overflow, and excessive consumption of system capacity.

Figure 1:
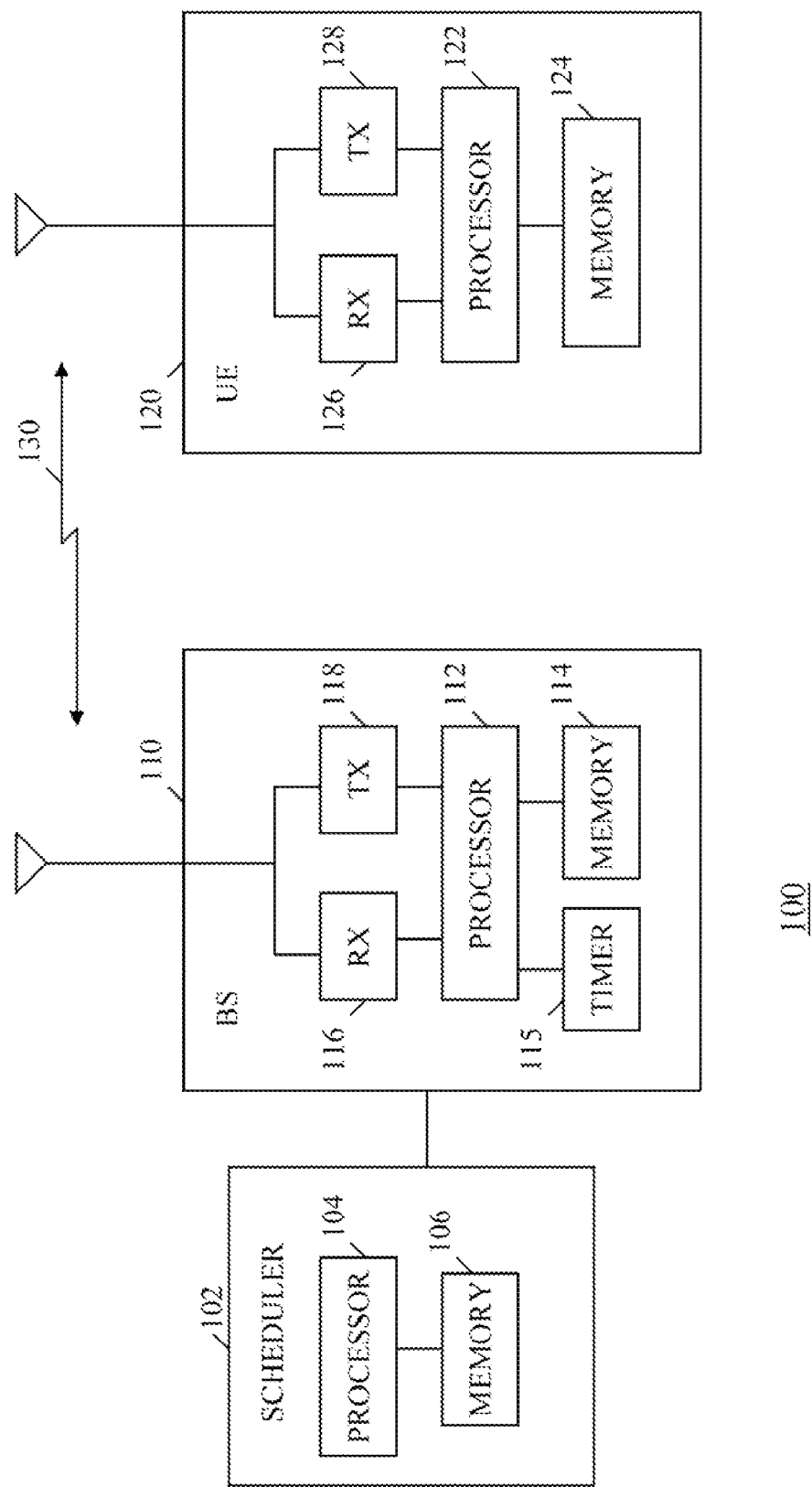
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus for facilitating an expedited exchange of Transmission Control Protocol (TCP) acknowledgments, thereby minimizing spurious timeouts at a TCP sender, reduced system throughput, buffer overflow, and excessive consumption of system capacity, a communication system is provided that schedules a TCP acknowledgment at a higher priority than Best Effort and/or that arranges for a scheduling of the TCP acknowledgment based on a predicted transmission of a request to schedule the TCP acknowledgment.

Generally, an embodiment of the present invention encompasses a method for scheduling an acknowledgment that includes transmitting a TCP data segment, receiving a Radio Link Control (RLC) acknowledgment associated with the TCP data segment and based on receipt of the RLC acknowledgment, arranging for a prioritizing of a TPC acknowledgment associated with the TCP data segment. The method may further comprise transmitting another TCP data segment and predictively arranging for a scheduling of a TCP acknowledgment for the another TCP data segment based on a determined radio link statistic.

Another embodiment of the present invention encompasses a communication device capable of operating in a wireless communication system, the communication device comprising a memory that is configured to store a TCP data segment and a processor that is configured to transmit the TCP data segment, receive an RLC acknowledgment associated with the TCP data segment and, based on receipt of the RLC acknowledgment, arrange for a prioritizing of a TPC acknowledgment associated with the TCP data segment. The processor further may be configured to transmit another TCP data segment and predictively arrange for a scheduling of a TCP acknowledgment for the another TCP data segment based on a determined radio link statistic.

Still another embodiment of the present invention encompasses a scheduler for scheduling wireless transmissions, the scheduler comprising a processor that is configured to schedule a transmission of a TCP data segment by a transmitting communication device and schedule a transmission of a TCP acknowledgment associated with the TCP data segment by a receiving communication device at a higher priority than Best Effort. The processor further may be configured to schedule a transmission of a subsequent TCP data segment by the transmitting communication device, receive a notification of a scheduling of the TCP acknowledgment for the subsequent TCP data segment and, in response to receiving the notification, schedule the TCP acknowledgment for the another TCP data segment prior to receiving a request to schedule the TCP acknowledgment from the receiving communication device.

The present invention may be more fully described with reference to FIGS. 1-3B. FIG. 1 is a block diagram of a wireless communication system 100 in accordance with an embodiment of the present invention. Communication system 100 includes a user equipment (UE) 120, such as but not limited to a cellular telephone, a radiotelephone, a smartphone or a Personal Digital Assistant (PDA), personal computer (PC), or laptop computer equipped for wireless communications. Communication system 100 further includes a base station (BS) 110 that provides communication services to users' equipment, such as UE 120, residing in a coverage area of the RAN via an radio link 130. Radio link 130 comprises a downlink and an uplink that each comprises multiple physical and logical communication channels, including multiple traffic channels and multiple signaling channels.

Each of BS 110 and UE 120 and includes a respective processor 112, 122, such as one or more microprocessors, microcontrollers, digital signal processors (DSPs), combinations thereof or such other devices known to those having ordinary skill in the art, which processor is configured to execute the functions described herein as being executed by the BS and UE, respectively. Each of BS 110 and UE 120 further includes a respective at least one memory device 114, 124 that may comprise random access memory (RAM), dynamic random access memory (DRAM), and/or read only memory (ROM) or equivalents thereof, that maintain data and programs that may be executed by the associated processor and that allow the BS and UE to perform all functions necessary to operate in communication system 100. Each of BS 110 and UE 120 also includes a respective radio frequency (RF) transmitter 118, 128 for transmitting signals over radio link 130 and a respective RF receiver 116, 126 for receiving signals via radio link 130. Additionally, BS 110 may include a timer 115 that is coupled to processor 112 and that measures a time period elapsing between a sending of data by the BS and a receiving, by the BS, of an acknowledgment of the data.

Communication system 100 further includes a scheduler 102 that is coupled to BS 110 and that performs the scheduling functions described herein. Scheduler 102 includes a processor 104 such as one or more microprocessors, microcontrollers, digital signal processors (DSPs), combinations thereof or such other devices known to those having ordinary skill in the art, which processor is configured to execute the functions described herein as being executed by the scheduler. Scheduler 102 further includes an at least one memory device 106 that may comprise random access memory (RAM), dynamic random access memory (DRAM), and/or read only memory (ROM) or equivalents thereof, that maintains data and programs that may be executed by the associated processor and that allow the scheduler to perform all functions necessary to operate in communication system 100. While scheduler 102 is depicted as an element separate from BS 110, in other embodiments of the invention, scheduler 102 may be implemented in the BS, and more particularly by processor 112 of the BS based on programs maintained by the at least one memory device 114 of the BS.

The functionality described herein as being performed by scheduler 102, BS 110, and UE 120 is implemented with or in software programs and instructions stored in the respective at least one memory device 106, 114, 124 associated with the scheduler, BS, and UE and executed by the processor 104, 112, 122 associated with the scheduler, BS, and UE. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the scheduler, BS, and UE. Based on the present disclosure, one skilled in the art will be readily capable of producing and implementing such software and/or hardware without undo experimentation.

In order for BS 110 and UE 120 to engage in a communication session, BS 110 and UE 120 each operates in accordance with known wireless telecommunications standards. Preferably, communication system 100 is a 3GPP LTE (Third Generation Partnership Project Long Term Evolution) communication system that operates in accordance with the 3GPP LTE standards. To ensure compatibility, radio system parameters and call processing procedures are specified by the standards, including call processing steps that are executed by the BS and UE. However, those of ordinary skill in the art realize that communication system 100 may be any wireless communication system that allocates radio link resources, such as a 3GPP UMTS (Universal Mobile Telecommunication System) communication system, a CDMA (Code Division Multiple Access) communication system, a CDMA 2000 communication system, a Frequency Division Multiple Access (FDMA) communication system, a Time Division Multiple Access (TDMA) communication system, or a communication system that operates in accordance with any one of various OFDM (Orthogonal Frequency Division Multiplexing) technologies, such as a Worldwide Interoperability for Microwave Access (WiMAX) communication system or a communication system that operates in accordance with any one of the IEEE (Institute of Electrical and Electronics Engineers) 802.xx standards, for example, the 802.11, 802.15, 802.16, or 802.20 standards.

Figure 2:
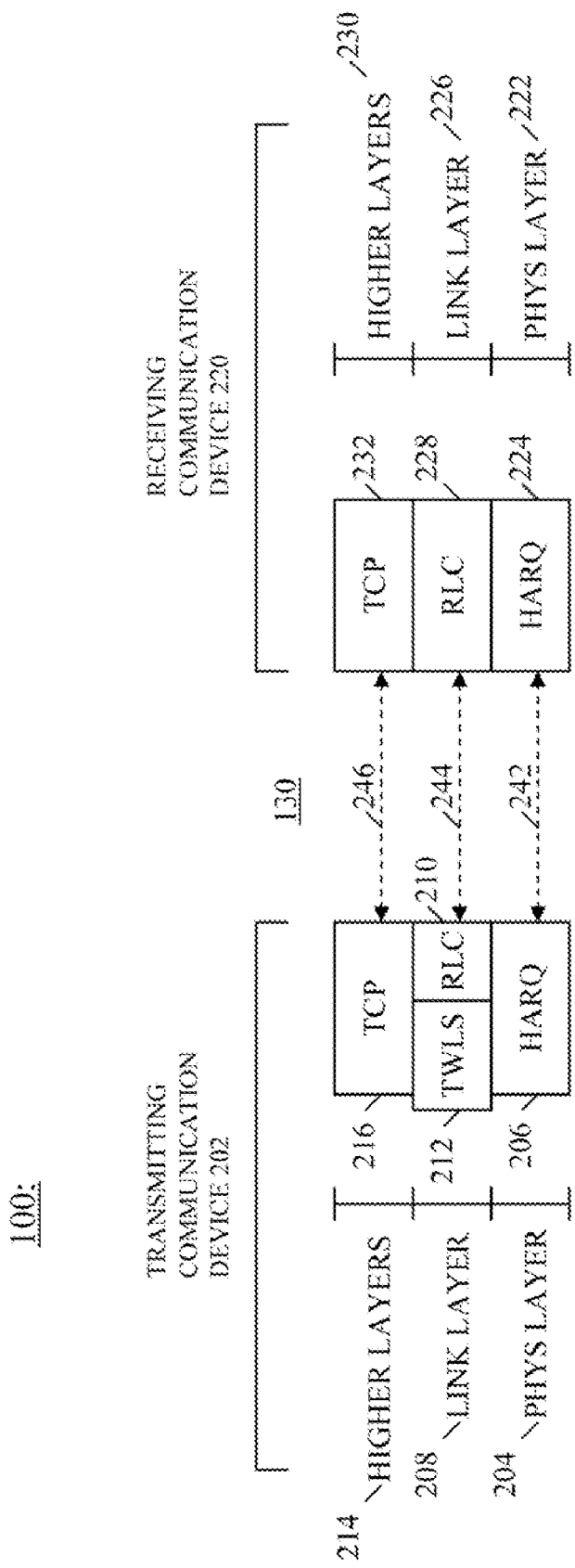
FIG. 2 is a block diagram illustrating an architecture of a transmitting communication device and a receiving communication device of the communication system of FIG. 1 in accordance with an embodiment of the present invention.

Referring now to FIG. 2, an architecture is depicted of a transmitting communication device 202 and a receiving communication device 220 of communication system 100 in accordance with an embodiment of the present invention. Preferably, transmitting communication device 202 comprises BS 110 and receiving communication device 220 comprises UE 120, although one of ordinary skill in the art realizes that each of BS 110 and UE 120 may function as either the transmitting communication device 202 or the receiving communication device 220. Each of transmitting communication device 202 and receiving communication device 220 is configured to enable the use of the downlink and the uplink of radio link 130 and to provide reliable wireless communication. As such, each of transmitting communication device 202 and receiving communication device 220 can be configured to verify an accuracy of received frames, to request or provide a re-transmission of incorrectly received or decoded frames, and further to distinguish between good frames and erased frames.

An architecture of transmitting communication device 202 includes a Physical Layer, or Layer 1, 204, a Link Layer, or Layer 2, 208 and higher layers 214. Physical Layer 204 includes a transmitting, or sending, device Hybrid Automatic Repeat reQuest (HARQ) functionality 206. In another embodiment of the present invention, HARQ functionality 206 may be implemented in a Medium Access Control (MAC) sublayer of Link Layer 208. Link Layer 208 includes a Radio Link Control (RLC) sublayer implementing an RLC transmitter 210, and further comprises Transmission Control Protocol Wireless Link Session (TWLS) functionality 212. Higher layers 214 includes a transmitting, or sending, device Transmission Control Protocol (TCP) functionality 216. Each of elements 206, 210, 212, and 216 may be implemented in a processor, such as processors 112 and 122, of the transmitting communication device based on software stored in an associated at least one memory device of the transmitting communication device, such as at least one memory devices 114 and 124, or may be implemented in hardware in a manner as can readily be determined by one of ordinary skill in the art.

TCP functionality 216 of transmitting communication device 202, also referred to herein as TCP sender 216, receives data that is sourced by an application layer, such as digitized voice data, non-real time data, or any type of IP packet, for a device user or application layer data from a data application such as an external personal computer (not shown) or a mobile data application, for example, a wireless access protocol (WAP) browser (not shown), voice-over-IP application, or a dispatch application. TCP sender 216 divides the received data into individual units of data, called TCP data segments, and routes the segments to the lower layers. TCP sender 216 further stores a copy of each segment in a corresponding TCP buffer maintained in the at least one memory device of the transmitting communication device so that an erroneously received segment, or a sent segment not acknowledged by a corresponding TCP functionality of receiving communication device 220 within a first predetermined period of time, may be retrieved and retransmitted.

In turn, RLC transmitter 210 receives a TCP data segment from TCP sender 216 and performs RLC functionality on the received data segment, such as breaking up the data segment into RLC data blocks, appending a sequence number to each block, and passing the block to HARQ functionality 206. The sequence number allows receiving communication device 220 to put the blocks in the order in which the blocks were generated. RLC transmitter 210 stores transmitted RLC data blocks in a corresponding RLC buffer maintained in the at least one memory device of the transmitting communication device so that an erroneously received block, or a sent block not acknowledged by a corresponding RLC receiver of receiving communication device 220 within a second predetermined period of time, may be retrieved and retransmitted.

HARQ functionality 206 of transmitting communication device 202, also referred to herein as HARQ sender 206, stores the received RLC blocks in an HARQ buffer of maintained in the at least one memory device of the transmitting communication device and conveys the blocks to receiving communication device 220 via Physical Layer 204 and air interface 130. HARQ sender 206 implements protocols that assure a reliable transmission of data in communication system 100 and that guarantee delivery of data at the Physical Layer or MAC sublayer by providing for a re-transmission of erroneously received data or of sent data that is not acknowledged. In response to receiving a negative acknowledgment (NACK) from a HARQ functionality of receiving communication device 220 that identifies at least a portion of an erroneously received block, or in response to failing to receive an acknowledgement within the third predetermined period of time after sending the frame, HARQ sender 206 re-transmits the erroneously received block or the identified portion.

At the Physical Layer 204, an encoding device (not shown) encodes the blocks pursuant to a known coding scheme and generates and applies overhead bits to provide for error protection. The encoded data is then forwarded to a transmitter, such as transmitters 118 and 128, where the encoded data may be interleaved, spread by a spreading code, modulated onto a carrier, and amplified to produce an output signal that is transmitted to receiving communication device 220 via radio link 130.

An architecture of receiving communication device 220 includes a Physical Layer 222, a Link Layer 226, and higher layers 230. Physical Layer 222 includes a receiving device HARQ functionality 224, also referred to herein as HARQ receiver 224. In another embodiment of the present invention, HARQ functionality 224 may be implemented in a Medium Access Control (MAC) sublayer of Link Layer 226. Link Layer 226 includes an RLC sublayer 228 implementing an RLC receiver 228. Higher layers 230 includes a receiving device TCP functionality 232, also referred to herein as TCP receiver 232. In various wireless protocols, TCP sender 216 and TCP receiver 232 may be implemented at Layer 3 or Layer 4. Each of elements 224, 228, and 232 may be implemented in a processor, such as processors 112 and 122, of receiving communication device 220 based on software stored in an associated at least one memory device of the receiving communication device, such as at least one memory devices 114 and 124, or may be implemented in hardware in a manner as can readily be determined by one of ordinary skill in the art.

A wireless receiver of receiving communication device 220, such as receivers 116 and 126, receives the output signal transmitted by transmitting communication device 202 and demodulates, despreads, and de-interleaves the received signal. The resulting signal is forwarded to a decoding device (not shown) that decodes the frame pursuant to a coding scheme utilized by the transmitting communication device and performs error detection and correction on received frames. In conjunction with HARQ sender 206, HARQ receiver 224 implements protocols that assure a reliable transmission of data in communication system 100 and that guarantee delivery of data at the Physical Layer by providing for a re-transmission of erroneously received data. HARQ receiver 224 acknowledges correctly received blocks by conveying a HARQ acknowledgment (ACK), identifying the correctly received block, to HARQ sender 206 of transmitting communication device 202 and forwards the correctly received block to RLC receiver 228. HARQ receiver 224 also requests re-transmissions of erroneously received blocks by conveying a HARQ negative acknowledgment (NACK) to HARQ sender 206, which HARQ NACK identifies the erroneously received block. HARQ receiver 224 further may provide for improved throughput by combining, rather than discarding, erroneously received transmissions with a current transmission.

RLC receiver 228 performs RLC sublayer functionality on the RLC data blocks received from transmitting communication device via Physical Layer 222 and HARQ receiver 224. Correctly received RLC data blocks are stored in an RLC buffer maintained by the at least one memory device of receiving communication device 220, where the data blocks are reordered based on their sequence numbers. RLC receiver 228 acknowledges correctly received blocks by conveying an RLC acknowledgment (ACK), identifying the correctly received RLC data block, to RLC transmitter 210. However, if RLC receiver 228 detects a missing sequence number, or if an RLC data block has not been correctly decoded, RLC receiver 228 can request re-transmission by sending or causing to be sent an RLC negative acknowledgment (NACK) to RLC transmitter 210. When RLC receiver 228 detects a missing sequence number or a frame that has not been correctly decoded, then the RLC receiver stores all subsequently received frames in the RLC buffer without forwarding them to TCP receiver 232 until the missing or incorrectly decoded block is re-transmitted and correctly received or is aborted. RLC receiver 228 then extracts the correctly received blocks in their sequential order, assembles a TCP data segment corresponding to the TCP data segment received by RLC transmitter 210 from TCP sender 216, and forwards the data segment to TCP receiver 232 for further processing.

In response to receiving a TCP data segment from RLC receiver 228, TCP receiver 232 acknowledges receipt of the data segment by conveying a TCP acknowledgment (ACK) back to TCP sender 216. In response to receiving the TCP ACK, TCP sender 216 then sends a next TCP data segment to TCP receiver 232 via RLC transmitter 210, HARQ sender 206, radio link 130, HARQ receiver 224, and RLC receiver 228.

In other words, when transmitting and receiving communication devices such as BS 110 and UE 120 engage in a reliable wireless communication session, peer-to-peer communication sessions are established between peer functions of the communication devices, that is, a HARQ wireless communication session 242 is established between HARQ sender and receiver 206 and 224, an RLC wireless communication session 244 is established between RLC transmitter 210 and RLC receiver 228, and a TCP wireless communication session 246 is established between TCP sender and receiver 216 and 232. Each of the HARQ sender/receiver, RLC transmitter/receiver, and the TCP sender/receiver then implements an exchange of acknowledgements (ACKs) and/or negative acknowledgements (NACKs) with the corresponding peer at the other communication device. The acknowledgements and negative acknowledgements are intended to inform the corresponding peer of the transmitting communication device of correctly received data and to request, from the corresponding peer, retransmissions of incorrectly received data, thereby assuring that data is correctly received at a given layer before the received data is passed to a higher layer at the receiving end.

The standards provide that TCP acknowledgments of TCP data, exchanged between peer TCP functionalities, are accorded Best Effort (BE) scheduling priority. Best Effort priority is a lower scheduling priority than Guaranteed Bit Rate (GBR) applications, that is, Best Effort data is queued behind data of GBR applications, and further competes with other Best Effort priority data for scheduling over the available bandwidth. For example, on an uplink, TCP acknowledgments typically are scheduled after Best Effort user data. This can result in a delay of conveyance, by a receiving communication device, of a TCP acknowledgment. In turn, delay of TCP acknowledgments can result in spurious timeouts at a TCP sender and reduced system throughput. That is, a TCP sender, of a transmitting communication device, defers transmitting remaining, not yet transmitted, data until correct receipt of the already transmitted data is acknowledged by the corresponding TCP functionality of the receiving communication device. Thus, a delay in a conveyance of TCP acknowledgments can result in the rapid filling up of a buffer storing data received from higher layers by a TCP sender and TCP data may be retransmitted even though the data has been correctly received at the TCP receiver of a receiving communication device.

Figure 3A:
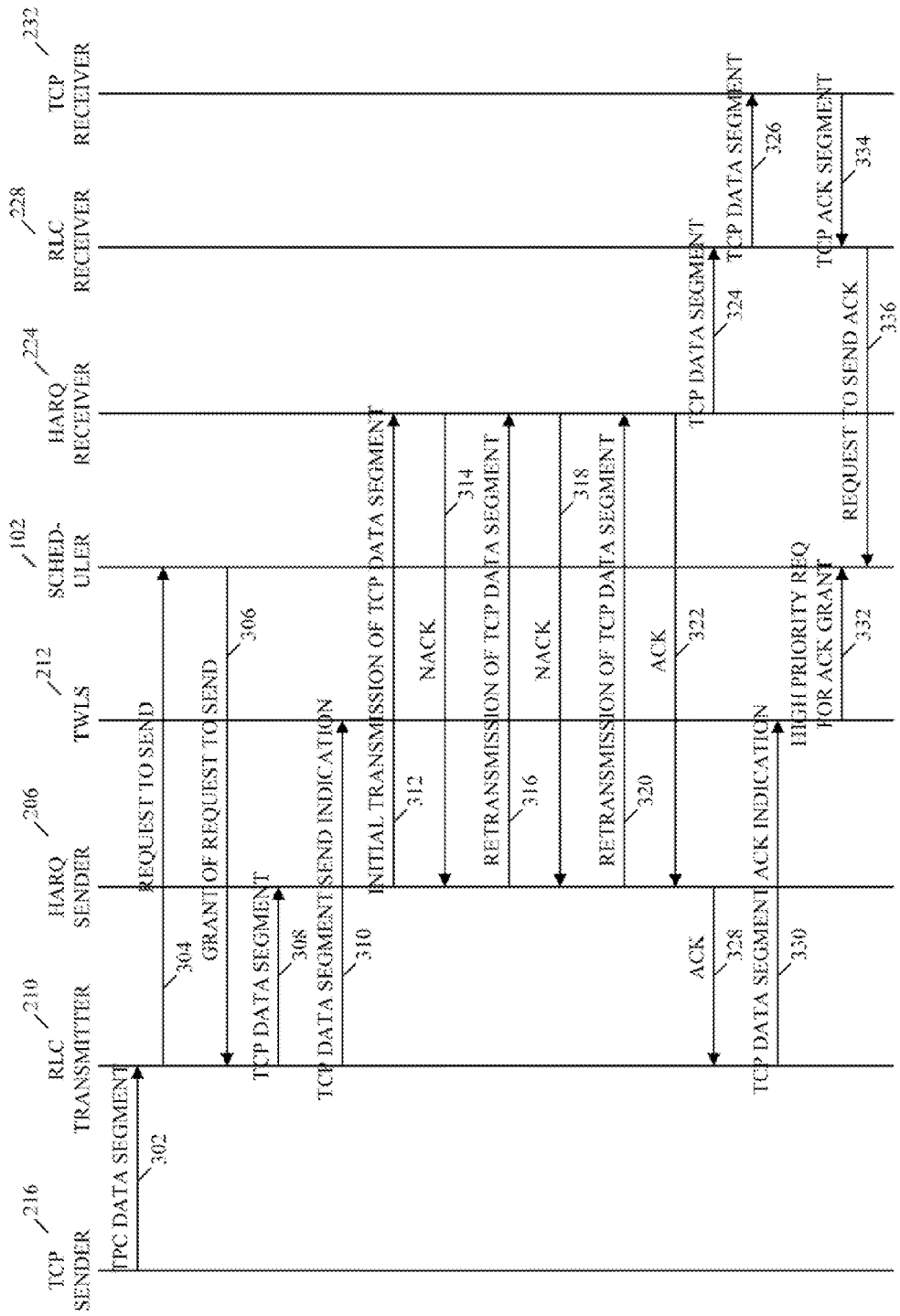
FIG. 3A is a signal flow diagram illustrating a scheduling of a Transmission Control Protocol acknowledgment by the communication system of FIG. 1 in accordance with an embodiment of the present invention.
Figure 3B:
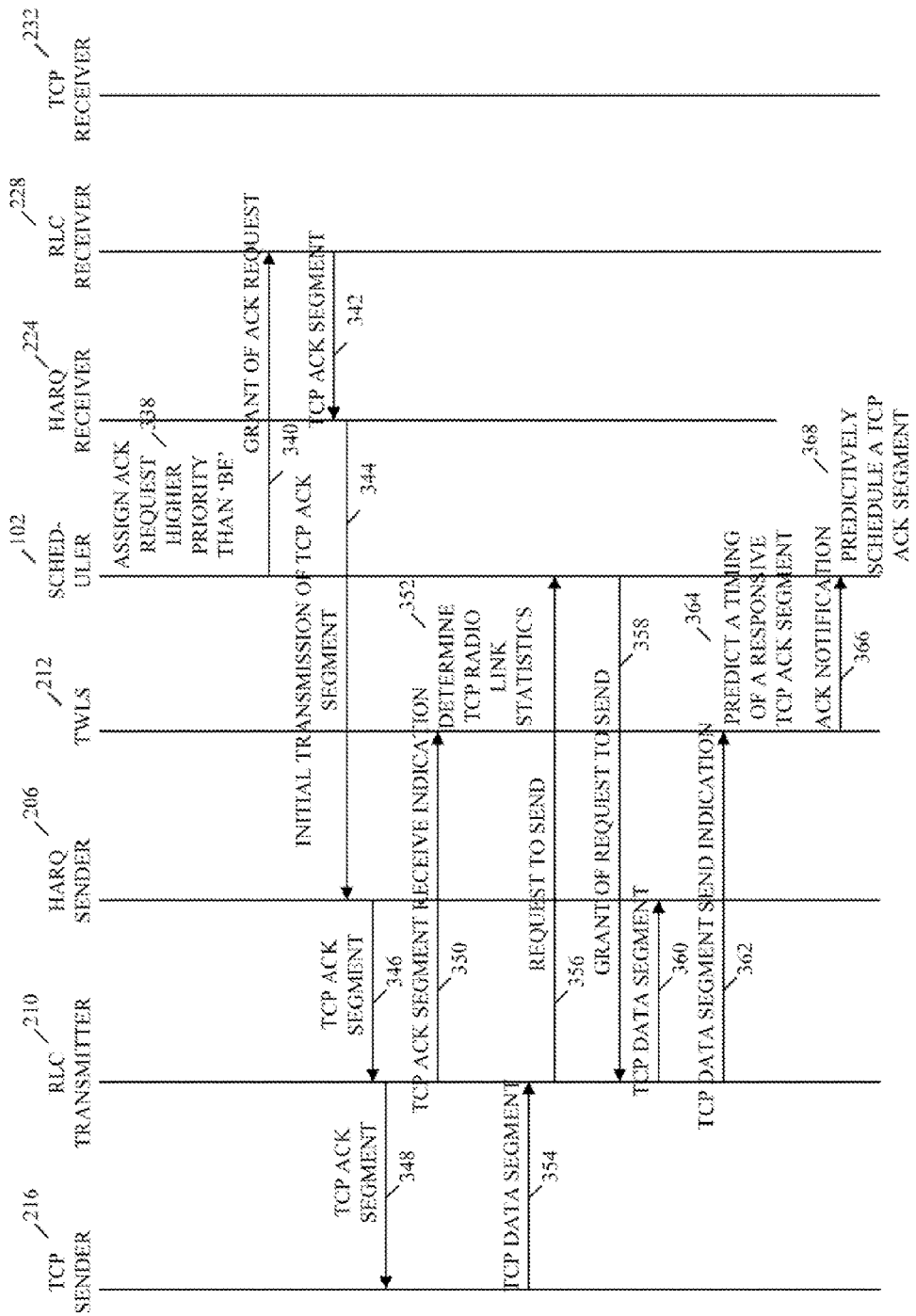
FIG. 3B is a continuation of the signal flow diagram of FIG. 3A illustrating a scheduling of a Transmission Control Protocol acknowledgment by the communication system of FIG. 1 in accordance with an embodiment of the present invention.

In order to resolve the problems that result from a delay in a scheduling of TCP acknowledgments, communication system 100 provides for a predictive scheduling of a TCP acknowledgment. Referring now to FIGS. 3A and 3B, a signal flow diagram 300 is provided that illustrates a scheduling of a TCP acknowledgment by communication system 100 in accordance with an embodiment of the present invention. Signal flow diagram 300 begins when TCP sender 216 conveys 302 a TCP data segment to RLC transmitter 210. In response to receiving the TCP data segment, RLC transmitter 210 creates RLP data blocks from the received TCP data segment and requests 304 that scheduler 102 schedule a data transmission for the transmitting communication device, preferably by conveying, to the scheduler, a transmitting communication device scheduling request.

In response to receiving the transmitting communication device scheduling request, scheduler 102 grants the request and conveys 306 a grant of the request back to transmitting communication device 202, and in particular to RLC transmitter 210. In response to receiving the grant of the transmitting communication device scheduling request, RLC transmitter 210 conveys 308 the TCP data segment, now reformatted in RLC data blocks, to HARQ sender 206. RLC transmitter 210 also informs 310 TWLS functionality 212 that the TCP data segment is being transmitted by conveying an indication of transmission of the TCP data segment, preferably a TCP Data Segment Send Indication, to the TWLS functionality. The TCP Data Segment Send Indication identifies the TCP data segment and/or corresponding RLC blocks being sent. In response to being informed that the TCP data segment is being transmitted, TWLS functionality 212 may start timer 115.

In response to receiving the RLC data blocks associated with the TCP data segment from RLC transmitter 210, HARQ sender 206 transmits 312 the TCP data segment, that is, the RLC data blocks associated with the TCP data segment, to receiving communication device 220, and in particular HARQ receiver 224, via radio link 130. If HARQ receiver 224 erroneously receives one or more such blocks from transmitting communication device 202, HARQ receiver 224 transmits 314 a HARQ NACK back to the transmitting communication device, and in particular to HARQ sender 206, via radio link 130 for each erroneously received block. In response to receiving one or more HARQ NACKs, HARQ sender 206 retransmits 316 the erroneously received RLC data block(s) to HARQ receiver 224. For each erroneously received block, the process of HARQ sender 206 retransmitting 316, 320 the erroneously received block and HARQ receiver 224 transmitting 314, 318 a corresponding negative acknowledgement may continue until one of a predetermined time period expires, a predetermined number of retransmissions occurs, or HARQ receiver 224 correctly decodes the block.

For each block correctly decoded by HARQ receiver 224, the HARQ receiver transmits 322 a HARQ ACK back to transmitting communication device 202, and in particular to HARQ sender 206, via radio link 130. HARQ receiver 224 further conveys 324 the correctly decoded RLC data block to RLC receiver 228. RLC receiver 228 stores the correctly received RLC data blocks corresponding to the sent TCP data segment in an RLC buffer maintained by the at least one memory device of the receiving communication device, processes the data blocks in accordance with RLC processing, and assembles a TCP data segment corresponding to the TCP data segment received by RLC transmitter 210 from TCP sender 216. RLC receiver 228 then forwards 326 the TCP data segment to TCP receiver 232 for further processing.

When HARQ sender 206 receives the HARQ ACKs for the TCP data segment, and more particularly for the data blocks associated with the TCP data segment, from HARQ functionality 224, HARQ sender 206 informs 328 RLC transmitter 210 that the data blocks have been acknowledged, for example, assembles and conveys one or more RLC ACKs to the RLC transmitter. However, in another embodiment of the present invention, RLC receiver 228 of receiving communication device 220 may convey to RLC transmitter 210 of transmitting communication device 202 the one or more RLC ACKs for the data blocks correctly received by the RLC receiver.

In response to receiving, by RLC transmitter 210, RLC ACKs for the TCP data segment, that is, for the RLC data blocks corresponding to the TCP data segment, RLC transmitter 210 informs 330 TWLS functionality 212 that RLC receiver 228 has acknowledged receipt of the TCP data segment. Preferably, RLC transmitter 210 informs TWLS functionality 212 of such by conveying an indication of the receipt of the RLC ACKs, preferably a TCP Data Segment Acknowledgment Indication, to the TWLS functionality. The TCP Data Segment Acknowledgment Indication identifies the RLC data blocks or the corresponding TCP data segment that has been acknowledged.

In response to being informed, by RLC transmitter 210, of the receipt of RLC sublayer acknowledgments for the TCP data segment, or in other words, that RLC receiver 228 has acknowledged receipt of the TCP data segment, TWLS functionality 212 anticipates or predicts a receiving, from receiving communication device 220, of a request to schedule a transmission associated with a TCP acknowledgement and arranges for a prioritizing of the TCP acknowledgement by requesting 332 that scheduler 102 prioritize the scheduling, for receiving communication device 220, of the TCP acknowledgement over other TCP data transmissions and preferably over all Best Effort applications. That is, TWLS functionality 212 requests, of scheduler 102, that a next scheduling of a Best Effort transmission by receiving communication device 220 be accorded a priority higher than Best Effort (but preferably lower than Guaranteed Bit Rate). In this way, TWLS functionality 212 anticipates, and anticipatorily arranges for the scheduling of, a TCP acknowledgment based on knowledge of RLC ACKs and without first receiving a request to schedule the TCP acknowledgment.

In response to receiving the TCP data segment, TCP receiver 232 acknowledges 334 receipt of the TCP data segment by conveying a TCP acknowledgment (ACK), and more particularly a TCP ACK segment, to RLC receiver 228. In response to receiving the TCP ACK, RLC receiver 228 requests 336 that scheduler 102 schedule a Best Effort transmission for receiving communication device 220 by conveying, to the scheduler, a receiving communication device scheduling request.

Based on the prioritization request received from TWLS functionality 212, scheduler 102 can anticipate receiving the receiving communication device scheduling request from RLC receiver 228 and further assigns 338 the receiving communication device scheduling request a higher priority than other Best Effort applications, such as TCP data transmissions. As a result, when scheduler 102 receives the receiving communication device scheduling request from RLC receiver 228, scheduler 102 schedules a transmission for receiving communication device 220 and conveys 340, to the receiving communication device and in particular to RLC receiver 228, a grant of the receiving communication device scheduling request before scheduling any other Best Effort applications.

In response to receiving the grant of the receiving communication device scheduling request, RLC receiver 228 conveys 342 the TCP ACK to HARQ receiver 224. HARQ receiver 224 transmits 344 the TCP ACK to transmitting communication device 202, and in particular to HARQ sender 206. In response to correctly receiving the TCP ACK, HARQ sender 206 forwards 346 the TCP ACK to RLC transmitter 210 which, in response to correctly receiving the TCP ACK, forwards 348 the TCP ACK to TCP sender 216. In addition, RLC transmitter 210 informs 350 TWLS functionality 212 of the receipt of the TCP ACK by conveying an indication of the receipt of the TCP ACK, preferably a TCP ACK Segment Receive Indication, to the TWLS functionality. TWLS functionality 212 then stops timer 115 if the TWLS functionality had started the timer when the corresponding data was sent.

Based on the received indication 310 of the transmission of the TCP data segment and the received indication 350 of the corresponding TCP ACK, TWLS functionality 212 determines 352 radio link statistics for radio link 130 between BS 110 and UE 120, which radio link statistics include link quality metrics and throughput associated with the radio link. Among the determined radio link statistics, TWLS functionality 212 calculates a radio link round trip time, that is, a time period corresponding to the time that expires between the transmitting of TCP data by transmitting communication device 202 to receiving communication device 220, and the receipt, by the transmitting communication device from the receiving communication device, of a TCP ACK for the sent data.

In response to receiving the TCP ACK, TCP sender 216 then may initiate 354 a repeat of steps 302 to 352 for a next TCP data segment. That is, TCP sender 216 conveys 354 another, that is, a next, TCP data segment to RLC transmitter 210. In response to receiving the next TCP data segment, RLC transmitter 210 creates RLP data blocks from the received next TCP data segment and requests 356 that scheduler 102 schedule a data transmission for the transmitting communication device, preferably by conveying, to the scheduler, a transmitting communication device scheduling request. In response to receiving the transmitting communication device scheduling request, scheduler 102 grants the request and conveys 358 a grant of the request back to transmitting communication device 202, and in particular to RLC transmitter 210. In response to receiving the grant of the transmitting communication device scheduling request, RLC transmitter 210 conveys the next TCP data segment, now reformatted in RLC data blocks, to HARQ sender 206.

RLC transmitter 210 also informs 362 TWLS functionality 212 that the next TCP data segment is being transmitted by conveying an indication of transmission of the TCP data segment, preferably a TCP Data Segment Send Indication, to the TWLS functionality. The TCP Data Segment Send Indication identifies the next TCP data segment and/or corresponding RLC blocks being sent. In response to being informed that the next TCP data segment is being transmitted, TWLS functionality 212 may start timer 115. Based on the determined radio link statistics, TWLS functionality 212 predicts 364 a timing of a TCP ACK corresponding to this next TCP data segment, that is, when the associated TCP ACK will be received by transmitting communication device 202 and/or sent by receiving communication device 220, based on a known signal propagation time over radio link 130 and a known signal processing time of transmitting communication device 202, which times are each stored in the at least one memory device of the transmitting communication device. Thus TWLS functionality 212 is able to predictively arrange for a scheduling of TCP ACKs for this next, and for thereafter subsequently transmitted, TCP data segments. That is, based on the determined radio link statistics, TWLS functionality 212 may notify 366 scheduler 102 of a scheduling of a TCP ACK for this next TCP data segment, and may notify scheduler 102 of a scheduling of a TCP ACK for each of subsequently transmitted TCP data segments, based on when the TWLS functionality expects receiving communication device 220 to transmit such acknowledgments. In turn, scheduler 102 then may predictively schedule 368 TCP ACKs for receiving communication device 220. That is, scheduler 102 may convey, to receiving communication device 220 and for each of the next and subsequent TCP ACKs, a scheduling of a receiving communication device transmission without first receiving a corresponding scheduling request from receiving communication device 220. Thus, receiving communication device 220 may convey, in an expedited fashion, a TCP ACK segment in response to the received TCP data segments regardless of delays incurred in transmission of requests, by the receiving communication device, to schedule the TCP ACKs. Signal flow diagram 300 then ends.

Thus, communication system 100 facilitates an expedited exchange of TCP ACKs by scheduling a TCP ACK at a higher priority than Best Effort and/or by arranging for a scheduling of the TCP ACK based on a predicted transmission, by receiving communication device 220, of a request to schedule the TCP acknowledgment. In turn, the predicted transmission of the TCP ACK is triggered by receipt, at the RLC sublayer of transmitting communication device 202, of an RLC ACK associated with the transmitted data.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for scheduling an acknowledgment comprising:
   transmitting a Transmission Control Protocol (TCP) data segment;
   receiving a Radio Link Control (RLC) acknowledgment associated with the TCP data segment; and
   based on receipt of the RLC acknowledgment, prioritizing of a TPC acknowledgment associated with the TCP data segment wherein the prioritizing comprises determining a radio link statistic associated with the transmission of the TCP data segment and a subsequent receipt of the TCP acknowledgement associated with the TCP data segment, notifying a scheduler of a scheduling of the TCP acknowledgment for another TCP data segment and in response to receiving the notification, scheduling, by the scheduler, the TCP acknowledgment for the another TCP data segment prior to receiving a request to schedule the TCP acknowledgment from a communication device that will transmit the TCP acknowledgment.

2. The method of claim 1, wherein a prioritizing of a Transmission Control Protocol (TPC) acknowledgment comprises assigning of a higher priority than Best Effort to a scheduling of the TCP acknowledgment.

3. The method of claim 1, further comprising anticipating, based on receipt of the Radio Link Control acknowledgment, transmission of a scheduling request associated with the Transmission Control Protocol acknowledgment.

4. The method of claim 1, wherein receiving a Radio Link Control (RLC) acknowledgment comprises receiving, by an RLC transmitter, the RLC acknowledgment and wherein prioritizing comprises, based on receipt of the RLC acknowledgment, prioritized scheduling of the Transmission Control Protocol (TCP) acknowledgment in anticipation of receiving a request to schedule the TCP acknowledgment.

5. The method of claim 4, wherein prioritizing of the Transmission Control Protocol (TCP) acknowledgement comprises requesting, based on receipt of the Radio Link Control (RLC) acknowledgment by the RLC transmitter, that a scheduler prioritize a scheduling of the TCP acknowledgement over one or more of other TCP data transmissions and other Best Effort traffic.

6. The method of claim 1, wherein the radio link statistic comprises a round trip time period associated with the Transmission Control Protocol (TCP) data segment and the TCP acknowledgment.

7. The method of claim 1, further comprising:
   transmitting another Transmission Control Protocol (TCP) data segment; and
   predictively scheduling of a TCP acknowledgment for the another TCP data segment based on the determined radio link statistic.

8. A communication device operating in a wireless communication system, the communication device comprising:
   a memory that is configured to store a Transmission Control Protocol (TCP) data segment; and
   a processor that is configured to transmit the TCP data segment, receive a Radio Link Control (RLC) acknowledgment associated with the TCP data segment and, based on receipt of the RLC acknowledgment, prioritize of a TPC acknowledgment associated with the TCP data segment wherein the prioritize comprises determining a radio link statistic associated with the transmission of the TCP data segment and a subsequent receipt of the TCP acknowledgement associated with the TCP data segment notifying a scheduler of a scheduling of the TCP acknowledgment for another TCP data segment and in response to receiving the notification, scheduling, by the scheduler, the TCP acknowledgment for the another TCP data segment prior to receiving a request to schedule the TCP acknowledgment from the communication device that will transmit the TCP acknowledgment.

9. The communication device of claim 8, wherein the processor is configured to prioritize a Transmission Control Protocol (TCP) acknowledgment by assigning of a higher priority than Best Effort to a scheduling of the Transmission Control Protocol acknowledgment.

10. The communication device of claim 8, wherein the processor further is configured to anticipate, based on receipt of the Radio Link Control acknowledgment, transmission of a scheduling request associated with the Transmission Control Protocol acknowledgment.

11. The communication device of claim 8, wherein the processor is configured to receive a Radio Link Control (RLC) acknowledgment by receiving, by an RLC transmitter, the RLC acknowledgment and wherein prioritizing comprises, based on receipt of the RLC acknowledgment, prioritized scheduling of the Transmission Control Protocol (TCP) acknowledgment in anticipation of receiving a request to schedule the TCP acknowledgment.

12. The communication device of claim 11, wherein the processor is configured to prioritize of the Transmission Control Protocol (TCP) acknowledgement by requesting, based on receipt of the Radio Link Control (RLC) acknowledgment by the RLC transmitter, that a scheduler prioritize a scheduling of the TCP acknowledgement over one or more of other TCP data transmissions and other Best Effort traffic.

13. The communication device of claim 8, wherein the radio link statistic comprises a round trip time period associated with the Transmission Control Protocol (TCP) data segment and the TCP acknowledgment.

14. The communication device of claim 8, wherein the processor further is configured to transmit another Transmission Control Protocol (TCP) data segment and predictively schedule of a TCP acknowledgment for the another TCP data segment based on the determined radio link statistic.

15. A base station comprising the communication device of claim 8.

16. A scheduler for scheduling wireless transmissions, the scheduler comprising a processor that is configured to schedule a transmission of a Transmission Control Protocol (TCP) data segment by a transmitting communication device and schedule a transmission of a TCP acknowledgment associated with the TCP data segment by a receiving communication device at a higher priority than Best Effort and schedule a transmission of a subsequent TCP data segment by the transmitting communication device, receive a notification of a scheduling of the TCP acknowledgment for the subsequent TCP data segment and, in response to receiving the notification, schedule the TCP acknowledgment for another TCP data segment prior to receiving a request to schedule the TCP acknowledgment from the receiving communication device.

17. The scheduler of claim 16, wherein the processor is configured to schedule the transmission of the Transmission Control Protocol (TCP) acknowledgment at a higher priority than Best Effort by receiving, from the transmitting communication device, a request to prioritize the transmission of the TCP acknowledgment and, based on the received request, schedule the transmission of the TCP acknowledgment of the TCP data segment at a higher priority than Best Effort.

\* \* \* \* \*